(12) United States Patent
Gråkjaar Jensen et al.

(10) Patent No.: US 6,219,983 B1
(45) Date of Patent: Apr. 24, 2001

(54) COVERING PLATE

(75) Inventors: Jens Jørgen Gråkjaar Jensen, Hinnerup; Claus Bratsbjerg; Per Andersen, both of Randers, all of (DK)

(73) Assignee: DaimlerChrysler Rail Systems (Denmark) A/S, Randers (DK)

( * ) Notice: Subject to any disclaimer, the term of this patent is extended or adjusted under 35 U.S.C. 154(b) by 0 days.

(21) Appl. No.: 09/254,347

(22) PCT Filed: Aug. 20, 1997

(86) PCT No.: PCT/DK97/00334

§ 371 Date: Mar. 5, 1999

§ 102(e) Date: Mar. 5, 1999

(87) PCT Pub. No.: WO98/09860

PCT Pub. Date: Mar. 12, 1998

(30) Foreign Application Priority Data

Sep. 6, 1996 (DK) .................................................. 0958/96

(51) Int. Cl.⁷ .................................................. B67D 17/10
(52) U.S. Cl. .......................... 52/403.1; 52/309.11; 52/480; 52/793.1; 52/794.1; 105/396; 244/137.1; 244/118.6; 296/191; 410/104; 410/115

(58) Field of Search ..................................... 52/403.1, 480, 52/309.11, 793.1, 794.1; 410/104, 115; 244/118.6, 137.1; 296/191; 105/396

(56) References Cited

U.S. PATENT DOCUMENTS

| | | | | |
|---|---|---|---|---|
| 2,605,064 | * | 7/1952 | Davis | 410/115 X |
| 3,294,354 | * | 12/1966 | Batey | 410/115 X |
| 5,383,630 | * | 1/1995 | Flatten | 244/118.6 |
| 5,827,022 | * | 10/1998 | Tovani | 410/104 X |

* cited by examiner

Primary Examiner—Christopher T. Kent
(74) Attorney, Agent, or Firm—James Creighton Wray; Meera P. Narasimhan

(57) ABSTRACT

A covering plate (5), for flooring in conveyances such as a railway car, is provided with a securing track (11) for securing seats, etc. The covering plate (5) is formed by a sandwich structure having a central core (24) arranged between an outer plate (25), which extends across the entire size of the covering plate, and second outer plates (26). The securing track (11) is formed in a profile (27) embedded in the sandwich structure so that a securing track (11) extends at a right angle to lateral edges (14) of the covering plate (5). As either end of the profile is provided with tracks (29) for receiving tight-fitting pins (30), a floor structure can be mounted easily and rapidly.

11 Claims, 3 Drawing Sheets

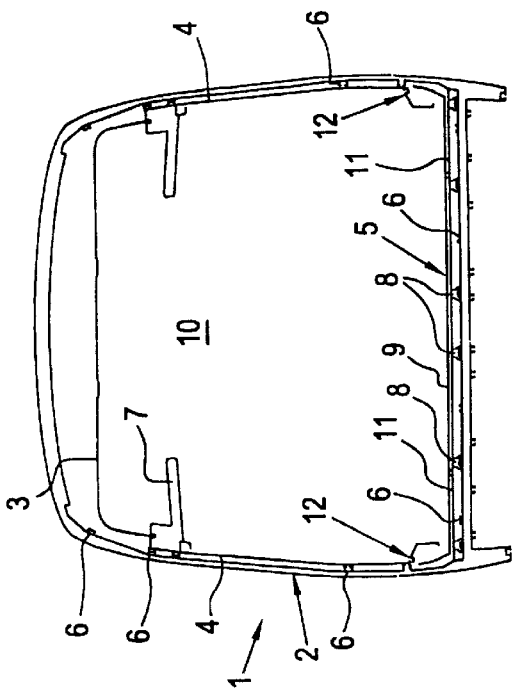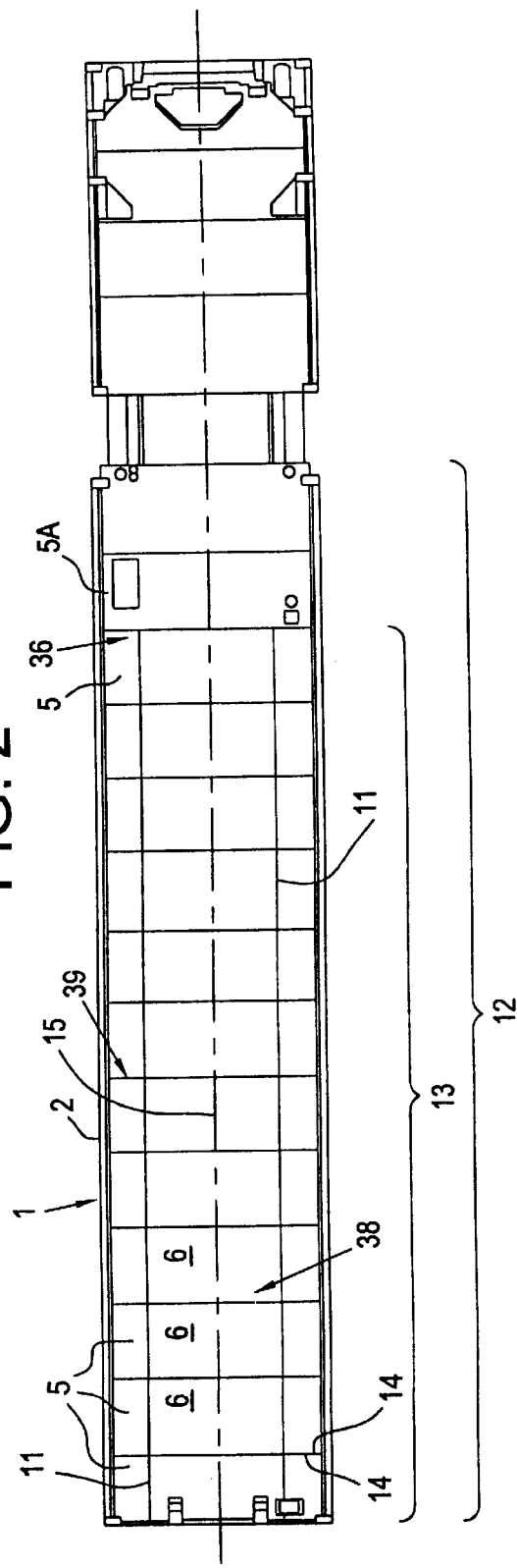

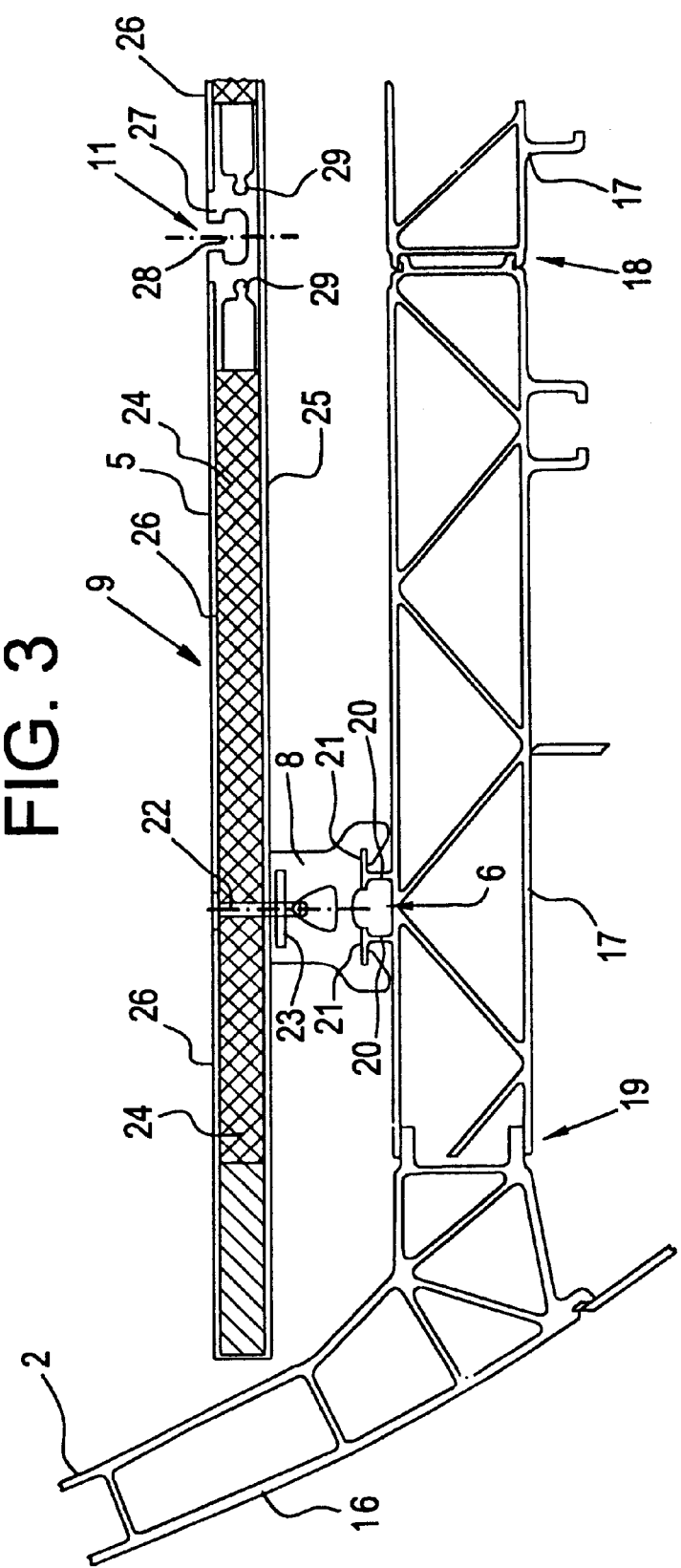

COVERING PLATE

BACKGROUND OF THE INVENTION

The present invention relates to a covering plate intended to form, together with a number of likewise formed and adjacent covering plates, a covering structure, which is designed for mounting on a carrying structure in conveyances, preferably railway cars, wherein the covering plate is formed by a sandwich structure having a central core, which is contained between two outer plates, said covering plate comprising:

a side facing the inside of the conveyances,
support members facing the carrying structure of the conveyances, and
at least one securing track formed in a profile in the sandwich structure and ending at the inwardly oriented side of the carrying plate.

SUMMARY OF THE INVENTION

The invention was developed in the context of floor structures for railway cars and will be particularly suited for this purpose. However, the invention will also be applicable in the context of covering plates for walls and ceilings when they are provided with securing tracks for securing shelves, tables, seats and similar furnishing elements, which are secured to the carrying structure by the covering plate. The invention is not only applicable in combination with railway cars. Thus, the covering plate may also be used in other conveyances for transport by sea, on land and in the air, such as ships, busses and aeroplanes.

Thus, the present invention may be used advantageously in substantially any conveyances in which the construction of the conveyances, including erection of covering plates, has been completed before a mounting of the furnishing elements is started. The invention may also advantageously be used in conveyances in which the securing tracks are used for securing luggage, cargo and the like, such as in the cargo compartment of an aeroplane.

When a railway car is built, mounting the train frame takes place first. Then the carrying structure and the outside enclosure in the form of outer walls are mounted. Subsequently the inside covering structure and furnishings are mounted.

The bottom of the railway car has hitherto been built up by laying rails provided with the securing tracks for seats. These rails extend throughout the length of the railway cars. Then the floor plates are placed between the rails. Thus, via supporting members the floor rails are brought into contact with the carrying structure of the conveyance. The supporting members are provided in the form of vibration-dampening spacing blocks, which are fastened to the carrying structure and to the rails.

This has had the disadvantage that positioning of the rails in a railway car has been dependent on the positioning of the fastening members of the carrying structure. Thus, it has been impossible to position the rails and, consequently, the securing track in a position independent of the design of the supporting structure. An example of a floor structure for a railway car is known e.g. from the description of German patent No. 3,115,699. Subsequently the actual car bottom is formed after the rails have been laid by cutting plates, which are positioned on either side of the floor rails.

This mounting is further disadvantageous in that any delays will have significant consequences for the total construction time of the railway car.

It is the object of the present invention to remedy the disadvantages of the known structures and to make it possible in an easy and simple manner to produce a covering plate, preferably for a floor structure supplied with a securing track in an optional position relative to the covering plate and relative to the supporting structure for the covering plate.

This is achieved according to the present invention by a covering plate of the type mentioned in the introduction being characterised in that a first one of said outer plates has a size corresponding to the size of the covering plate, and a second one of said outer plates is constituted by a number of plate sections, that the securing track is formed in a profile, which is cast in a random position in the sandwich structure, that the profile extends at a right angle between two opposed parallel lateral edges of the covering plate, which are intended to be placed opposite each other in use, and that at each end of the profile there are provided positioning members.

When producing the covering plate as a sandwich structure with an enclosed profile it is possible to obtain sufficient strength of the structure for the profile to be positioned in a random position in the sandwich structure. Thus, it is possible to make a covering plate having a width that corresponds to the intended use, e.g. the width of a railway car, and having the securing tracks extending transversely. Thus, a number of aligned tracks in separate covering plates will form a floor rail that extends throughout the length of the railway car when the covering plates are positioned side by side for the formation of a floor covering. The floor structure formed by a number of covering plates may be mounted with the first outer plate, facing away from the inside of the craft, in contact with supporting members, e.g. vibration-dampening rubber blocks secured to the supporting structure, irrespective whether said supporting members/rubber blocks are placed underneath a profile or in a position between the profiles.

Thus, with a covering plate according to the invention it will be possible in a simple manner to prefabricate the covering plates with the profiles arranged in a random desired position. This is done simply by amending the fixtures that are used for laying the sandwich structure and which are used for fixing the rails on top of the unbroken outer plate. By amending the positions of the fixtures in the mould the profile may have a desired position in the transverse direction of the covering plate. Hereby it is possible to produce covering plates that will satisfy different needs, e.g. when using different types of inventory. This may be the case when in different countries there are different requirements as to the seat width in the railway car or when there are different requirements as to the width of luggage racks mounted in a ceiling covering.

A further advantage of the covering plate according to the invention is that it may be produced beforehand. Owing to this the actual mounting process in the railway car may take place very swiftly. This is vital in respect of the total mounting of a railway car where there must be a very rigid and precise control on the partial mounting by individual trades. If a single, per se unimportant, mounting operation, e.g. of the floor covering, is delayed, this will make subsequent mounting operations impossible or cause considerable delays to them. Mounting of the prefabricated covering plates according to the invention is done simply and rapidly by means of the positioning members provided at either end of the profile. Thus, no fitting of the covering plates is required during the mounting operation.

The invention further relates to a method for manufacturing a covering plate as described above, said method being characterised in that a first outer plate having a size corresponding to that of the covering plate is laid in a mould, that a desired number of profiles are laid on said outer plate, the positioning members being used for correct positioning in co-operation with a fixture, that a core material is placed between the profiles, and that the second outer plate is laid using a number of plate sections, which are arranged between the profiles.

As the positioning members in the profile ends co-operate with the fixture of the mould, a fast and exact laying of the profiles in a desired position is obtained.

DESCRIPTION OF THE DRAWING

The invention will now be explained in detail with reference to the accompanying drawing, which shows a specific embodiment of a covering plate for use in the manufacture of a floor in a railway car, and wherein FIG. 1 shows a cross-section view through a railway car, which is arranged with a floor formed by covering plates according to the invention, FIG. 2 a plane view to illustrate the railway car floor, FIG. 3 a partial sectional view, in large scale, through the railway car floor, FIG. 4 a partial view of a detail of a covering plate according to the invention, FIG. 5 a partial sectional view to illustrate the joint between two covering plates according to the invention, FIG. 6 a partial view of a detail of a covering plate according to the invention, FIG. 7 a partial sectional view to illustrate a joint between two covering plates according to the invention, and FIGS. 8 and 9 partial sectional views to illustrate the joint between covering plates according to the invention.

DETAILED DESCRIPTION OF THE PREFERRED EMBODIMENTS

Figure 5:
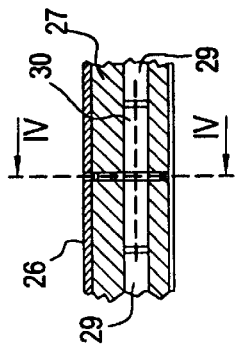

In the different figures of the drawing identical reference numerals have been used to designate identical or corresponding elements. An explanation of all elements will not be given in connection with every single figure.

Seen in FIG. 1 is a railway car 1 having a carrying structure in the form of a car body 2. The railway car 1 is provided with inner covering plates. A ceiling covering plate 3, wall covering plates 4 and a floor covering plate 5 are shown. Below the covering plate according to the invention will be explained merely in relation to the floor covering plate 5. However, a corresponding structure could be used for the ceiling covering plate 3 and the wall covering plate 4.

The carrying structure is provided with members 6 for securing covering plates 3, 4, 5 and other fitting elements, such as luggage racks 7, in the railway car. The securing members 6 may either be used for a direct securing or for an indirect securing, e.g. by means of vibration-dampening spacing blocks 8.

The covering plate 5 has a side 9 that faces the inside 10 of the railway car. A securing track 11 for fastening seats (not shown) ends in the side 9. Shown in the wall covering plate 4 is a corresponding securing track 12, which may be used for fastening seats as well as tables. The securing tracks 11 and 12 extend throughout the length of the railway car. Alternatively, the securing tracks 11, 12 extend through a compartmental section. E.g. this may be the case in railway cars where several floor levels are used. The vibration-dampening spacing blocks S are fastened to the covering plate 5 in a manner that will be explained later. The spacing blocks 8 are the only connection between the covering plate 5 and the car body 2.

For the sake of completeness it is noted that the car body shown in FIG. 1 is intended to be used on a car frame and that the car body 2 may be supplied with fitting elements such as toilet rooms, partitions etc., such as is known for the building of railway cars.

FIG. 2 shows a plane view of the railway car 1 shown in fig, 1. FIG. 2 illustrates the way in which the railway car floor is built up, The floor is built up from a number of covering plates 5 each of which is provided with two securing tacks 11. The securing tracks 11 extend transversely of a covering plate 5 so that an unbroken securing track 11 is formed. The unbroken securing track 11 is placed in a car section 12 where the floor is placed in the same level and extends over a length 13. The floor covering plates 5 have two opposite and mutually parallel lateral edges 14. These are placed in contact with each other. The lateral edges 14 are placed at a right angle relative to a central line 15 through the railway car. The securing tracks 11 are arranged at a right angle to the lateral edges 14 and, thus, are parallel to the central line 15.

FIG. 3 shows a partial sectional view in large scale to illustrate the railway car floor at a position corresponding to the lower left corner of FIG. 1. The car body 2 consists of several profiles. The car body is built from curved wall profiles 16 and rectilinear bottom profiles 17. The bottom profiles 17 are mutually connected by means of engagement members 18 so that a support is formed extending across the width of the railway car. The bottom profiles 17 are connected with the wall profiles 16 via engagement members 19.

The bottom profiles 17 are provided with fastening members 6, which are formed by two T-shaped ribs 20. The ribs 20 engage with tracks 21 in the spacing block 8. The spacing block 8 is fastened to the floor covering plate 5 by means of a screw 22, which is driven through the floor covering plate S and driven into a threaded fastening plate 23, which is embedded in the spacing block 8. The spacing block 8 provides vibration dampening so as to obtain comfort in the inside 10 of the railway car.

The covering plate 5 is formed by a sandwich structure, which has a central core 24 contained between two outer plates 25, 26. The first outer plate 25 faces away form the inside 10 of the railway car and has a size corresponding to the size of the entire covering plate 5. The second outer plate 26 is constituted by a number of plate sections positioned between the securing tracks 11, which end at the inwardly oriented side 9 of the floor covering plate 5.

Each securing track 11 is formed in a profile 27, which is embedded in the sandwich structure. The profile 27 extends perpendicularly between the two opposed parallel lateral edges 14 of the floor covering plate, said edges being placed against each other when laying the floor, such as illustrated in FIG. 2.

The securing track 11 is constituted by a central C-shaped track 28, which is open in upward direction. The track 28 may be used in a manner known per se for securing seats and the like. It is seen from FIG. 3 that the profile 27 has two tracks 29 at opposite sides. The tracks 29 extend along the entire length of the profile 27, the profile being produced by extrusion. The outer end sections of the tracks 29 at either lateral edge 14 of the floor covering plate 5 form positioning members capable of cooperating with tight-fitting pins 30

Figure 4:
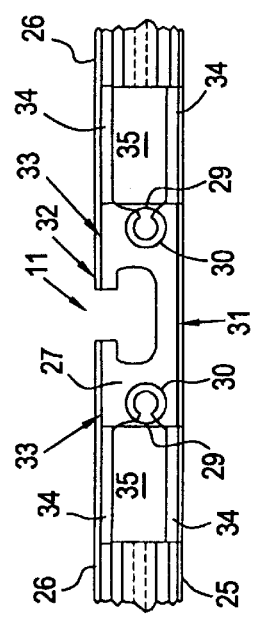

(see FIGS. 4 and 5). In this manner a correct mutual positioning of subsequent profile sections 27 is ensured so that a rectilinear securing track 11 is formed when several floor covering plates 5 are laid side by side.

FIGS. 4 and 5 show and end view of the profile 27, respectively a sectional view through a joint between two covering plates 5. It is seen that the tight-fitting pins 30 are mounted in the ends of the tracks 29 and, thus, are simultaneously in contact with two aligned profiles 27. The profile has two substantially parallel opposite sides 31, 32. The first side 31 is positioned on the first outer plate 25, and the second side 32 is positioned in level with the level of the second outer plates 26. The second outer plates are positioned in a recess 33 at the upper side of the profile so that the upper side of the outer plate 26 and the side 32 extend in the same plane.

The profile 27 is provided with outwardly oriented flanges 34. The flanges 34 ensure that the profile has a large surface for contact with the outer plates so that the fastening in the sandwich structure occurs with maximum strength. Formed between the flanges 34 there is also a space 35, which is in connection with the tracks and which ends at the sides of the profiles. Owing to this it is possible to manufacture the profile 27 by extrusion. In this manner a very exact positioning of the tracks 29 is obtained. This means that the tracks may be used, without further adaptation, as positioning members to ensure correct alignment of the securing tracks 11. The tracks 29 also serve to position the profiles 27 correctly in a mould during the production of the covering plate since the tracks 29 are able to co-operate with a fixture containing positioning pins corresponding to the tight-fitting pins 30.

Figure 7:
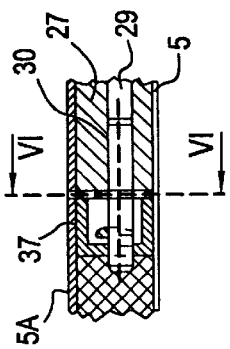
Figure 6:
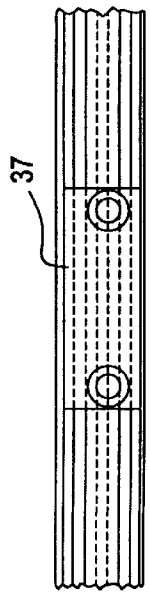

FIGS. 6 and 7 show a joint of a floor covering plate 5 with rails and a floor covering plate 5A without rails. The joint illustrated in FIGS. 6 and 7 is a joint at position 36. In such a joint the tight-fitting pin 30 mounted in the profile 27 will co-operate with positioning holes in an moulding rail 37, which is mounted in the edge of the adjacent floor covering plate 5A. In this manner it is possible to ensure that floor covering plates 5A, which may be used e.g. for finishing a floor or for forming a car section where toilet rooms etc. are placed, are aligned correctly relative to the floor covering plates 5, which are provided with the securing tracks 11.

Figure 9:
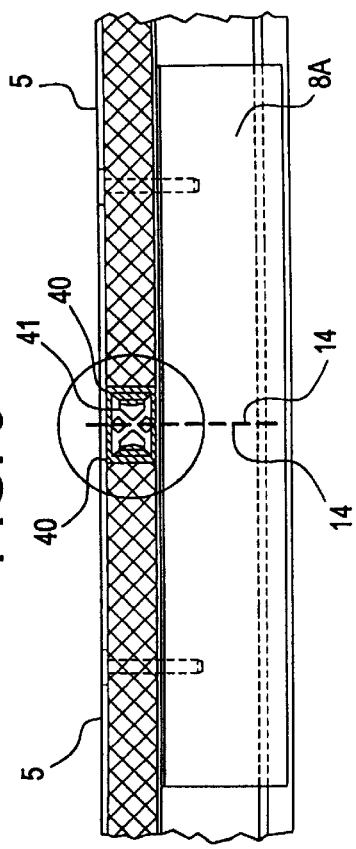
Figure 8:
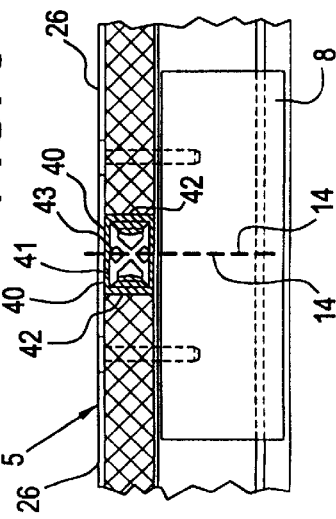

FIGS. 8 and 9 show partial sectional views to illustrate a joint between the floor covering plates 5 at position 38, respectively 39, in FIG. 2. Thus, a sectional view is shown through the joint of the lateral edges 14 at a position between the profiles 27. The floor covering plates 5 are provided with U-shaped mouldings 40, which substantially correspond to the moulding 37. Arranged in the space formed between the two adjacent mouldings 40 there is a lock profile 41, which co-operates with dowels 42 projecting from the bottom of either of the two U-profiles 40. A gap between two lateral edges 14 is sealed with a scaling agent 43 in order to form an unbroken transition between the outer plates 26. Arranged under the joint between the two floor covering plates 5 there is a spacing member 8. Across the width of the plate a number of spacing members 8 are arranged.

The number of spacing members arranged along a joint or alternatively centrally under a plate depends on the load that will occur on the floor structure in the individual section of the railway car 1.

Shown in FIG. 9 is a similar joint near a lateral wall of the railway car where spacing blocks 8A are used that have a larger length than the spacing blocks arranged in a central position in the railway car. It is noted that the length of the spacing blocks may be varied as desired. Consequently, a spacing block 8A having a larger length than the spacing block 8 is shown.

As appears in particular from FIGS. 1 and 3, the supporting blocks 8 are arranged in a random position, which is not located directly underneath the profiles 27. As a sandwich structure is used for the formation of the floor covering plate 5, it will have such strength that the floor formed may be fastened to the support of the railway car in said random position independent of the position of the profiles 27 in the covering plate 5. This provides much freedom of choice for the positioning of the profiles 27 in the covering plate independent of the positioning of fastening members 6 of the supporting structure. Thus, it will be possible to use one and the same carrying structure in railway cars supplied to different customers who make different requirements as to the positioning of the securing tracks 11.

The covering plate 5 according to the invention is very simple to manufacture. Thus, when forming the sandwich structure, the first outer plate 25 will be laid in a mould. Then a desired number of profiles 27 are laid down, the positioning of which in the mould is determined by means of a fixture that is displaced along the mould edge and which has pins co-operating the tracks 29 in the profile 27. Afterwards, the core material, either in the form of foam or foamed plastic material, is placed in between the profiles. Then the second outer plates 26 are laid. Laying second outer plates 26 is facilitated as the recesses 33 are used for guiding the outer plates 26 so that they are positioned correctly.

In the manufacture of the sandwich structure generally known gluing techniques are used and the glue used is able to cure at room temperature or subject to heating. It will be possible to use different well-known techniques, e.g. presses or vacuum moulds, to hold together the individual parts of the sandwich structure.

After the floor covering plates have been formed, there will be a trimming of the lateral edges 14 and possibly the other lateral edges in a finishing machine. Simultaneously a boring of holes may take place for reception of the bolts 22, which are used for fastening the spacing blocks 8. Such boring of the holes may advantageously take place automatically on the basis of data stored in the control unit of the finishing machine. Such data may be based on information on the conditions of load in a car section as well as the positions of the fastening members 6 in the carrying structure of the railway car. After this trimming of edges the floor covering plates 5 will be ready for mounting. This mounting of the floor in the railway car may take place very fast and requires no separate adaptation and planing.

What is claimed is:

1. A covering structure for conveyances comprising a carrier, plural covering plates for mounting on the carrier in the conveyances, each covering plate comprising two outer plates and a central core contained between the outer plates to form a sandwich structure, a side of the covering for plate facing the inside of the conveyance, support members facing the carrier, a first one of said outer plates having a size corresponding to a size of the covering plate, and a second one of said outer plates having plural plate sections, at least one securing track formed in a profile embedded in a random position in the sandwich structure and ending at an inwardly oriented side of the covering plate, positioning members at each end of the profile, wherein the profile extends at a right angle between two opposed parallel lateral edges of the covering plate, which are opposite each other in use.

2. The covering plate of claim 1, wherein the profile has two substantially parallel opposite sides, and one side of the profile being positioned on a first outer plate and a second side being positioned in a level substantially corresponding to a level of a second outer plate.

3. The covering plate of claim 2, further comprising flanges on the two opposed sides of the profile, wherein the outer plates rest on the flanges.

4. The covering plate of claim 3, further comprising recesses on the flanges for facing an inside of the conveyance for receiving edge areas of the outer plates facing the inside of the conveyances.

5. The covering plate of claim 4, wherein the positioning members are undercut open tracks at a third and a fourth side of the profile, wherein the positioning members are positioned between the opposite sides of the profile, and wherein the tracks receive tight-fitting pins in either end.

6. The covering plate of claim 5, wherein the positioning members are circular tracks being open via a slit for securing the profile.

7. The covering plate of claim 1, wherein the profile is an extruded aluminum profile.

8. The covering plate of claim 6, wherein the circular tracks are substantially C-shaped tracks.

9. The covering plate of claim 1, wherein the conveyances are railway cars.

10. A method for manufacturing a covering plate comprising, laying a first outer plate having a size corresponding to that of the covering plates in a mould, providing at least one securing track on the first outer plate;

laying a desired number of profiles on the first outer plate and forming a sandwich structure, providing positioning members on the profiles for correctly positioning in co-operation with a fixture, placing a core material between the profiles, and laying a second outer plate using a number of plate sections arranged between the profiles.

11. The method of claim 10, wherein laying the plate sections for the second outer plate is guided by recesses in the profile.

* * * * *